United States Patent
Machida

(10) Patent No.: US 8,611,498 B2
(45) Date of Patent: Dec. 17, 2013

(54) IMAGE PROCESSING APPARATUS, IMAGE PROCESSING METHOD, RADIATION IMAGING SYSTEM, AND COMPUTER-READABLE RECORDING MEDIUM

(75) Inventor: Yoshihito Machida, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 311 days.

(21) Appl. No.: 13/210,698

(22) Filed: Aug. 16, 2011

(65) Prior Publication Data

US 2012/0049081 A1    Mar. 1, 2012

(30) Foreign Application Priority Data

Aug. 27, 2010    (JP) .................................. 2010-191320

(51) Int. Cl.
*H05G 1/64*    (2006.01)
(52) U.S. Cl.
USPC ...................................................... 378/98.12

(58) Field of Classification Search
USPC .................... 378/62, 98.8, 98.12; 382/132
See application file for complete search history.

(56) References Cited

U.S. PATENT DOCUMENTS 7,440,599 B2    10/2008    Kato

*Primary Examiner* — Jurie Yun
(74) *Attorney, Agent, or Firm* — Canon USA Inc. IP Division

(57) ABSTRACT

An image processing apparatus includes an image acquisition unit configured to acquire a pixel value range for each of a plurality of partial images captured for a plurality of partial imaging ranges which an imaging region of a subject is divided into, an offset value acquisition unit configured to acquire a value indicating pixel value distribution of an overlapping area in each of the plurality of partial images, a correction value acquisition unit configured to calculate for each partial image a shift amount for minimizing a difference between the values indicating pixel value distribution of the overlapping areas, and setting each of the pixel value range within a predetermined range, and a correction unit configured to shift pixel values by the shift amount for each partial image.

11 Claims, 7 Drawing Sheets

FIG. 3

|  | PARTIAL IMAGE 1 | PARTIAL IMAGE 2 | PARTIAL IMAGE 3 |
|---|---|---|---|
| OFFSET VALUE | 0 | -600 | -700 |
| MINIMUM AND MAXIMUM PIXEL VALUES | (500, 2500) | (500, 2400) | (300, 2900) |
| SUM OF OFFSET VALUE AND MINIMUM AND MAXIMUM PIXEL VALUES | (500, 2500) | (-100, 1800) | (-400, 2200) |
| OUT OF RANGE OR WITHIN RANGE | WITHIN RANGE | OUT OF RANGE | OUT OF RANGE |
| CORRECTION VALUE | +400 | -200 | -300 |
| MINIMUM AND MAXIMUM PIXEL VALUES AFTER SHIFT CORRECTION | (900, 2900) | (300, 2200) | (0, 2600) |

FIG. 4

| | PARTIAL IMAGE 1 | PARTIAL IMAGE 2 | PARTIAL IMAGE 3 |
|---|---|---|---|
| OFFSET VALUE | 0 | −600 | +300 |
| MINIMUM AND MAXIMUM PIXEL VALUES | (500, 2500) | (400, 2400) | (300, 2900) |
| TEMPORARY CORRECTION VALUE | +100 | −500 | +400 |
| SUM OF TEMPORARY CORRECTION VALUE AND MINIMUM AND MAXIMUM PIXEL VALUES | (600, 2600) | (−100, 1900) | (700, 3300) |
| OUT OF RANGE OR WITHIN RANGE | WITHIN RANGE | OUT OF RANGE | WITHIN RANGE |
| CORRECTION VALUE | +200 | −400 | +500 |
| MINIMUM AND MAXIMUM PIXEL VALUES AFTER SHIFT CORRECTION | (500, 2700) | (0, 2000) | (800, 3400) |

FIG. 5

| | PARTIAL IMAGE 1 | PARTIAL IMAGE 2 | PARTIAL IMAGE 3 |
|---|---|---|---|
| OFFSET VALUE | 0 | −600 | +300 |
| MINIMUM AND MAXIMUM PIXEL VALUES | (500, 2500) | (400, 2400) | (300, 2900) |
| TEMPORARY CORRECTION VALUE | +100 | −500 | +400 |
| SUM OF TEMPORARY CORRECTION VALUE AND MINIMUM AND MAXIMUM PIXEL VALUES | (600, 2600) | (−100, 1900) | (700, 3300) |
| OUT OF RANGE OR WITHIN RANGEW | WITHIN RANGE | OUT OF RANGE | WITHIN RANGE |
| CORRECTION VALUE | +200 | −400 | +500 |
| MINIMUM AND MAXIMUM PIXEL VALUES AFTER SHIFT CORRECTION | (500, 2700) | (0, 2000) | (800, 3400) |

IMAGE PROCESSING APPARATUS, IMAGE PROCESSING METHOD, RADIATION IMAGING SYSTEM, AND COMPUTER-READABLE RECORDING MEDIUM

BACKGROUND OF THE INVENTION

1. Field of the Invention

The present invention relates to an image processing apparatus for combining a plurality of partial images, an image processing method, a radiation imaging system, and a computer-readable recording medium storing a program for causing a computer to execute image processing.

2. Description of the Related Art

When combining a plurality of partial images into one image, correction is made by shifting pixel values for each partial image to make the seams of images unnoticeable. U.S. Pat. No. 7,440,599 discusses a technique for sequentially performing correction using a specific image as a reference.

Meanwhile, when combining a plurality of images into one, shifting pixel values using a certain image as a reference may cause pixel values to exceed an output bandwidth possibly resulting in overexposure or underexposure.

SUMMARY OF THE INVENTION

According to an aspect of the present invention, an image processing apparatus includes: an acquisition unit configured to acquire a pixel value range for each of a plurality of partial images captured for a plurality of partial imaging ranges which an imaging region of a subject is divided into, and a value indicating pixel value distribution of an overlapping area in each of the plurality of partial images; a calculation unit configured to calculate for each partial image a shift amount for minimizing a difference between the values indicating pixel value distribution of the overlapping areas, and setting each of the pixel value range within a predetermined range; and a correction unit configured to shift pixel values by the shift amount for each partial image.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates an example correction value calculation by the image processing apparatus.

FIG. 4 illustrates an example correction value calculation by the image processing apparatus.

FIG. 5 illustrates still an example correction value calculation by the image processing apparatus.

DESCRIPTION OF THE EMBODIMENTS

Various exemplary embodiments, features, and aspects of the invention will be described in detail below with reference to the drawings.

Figure 1:
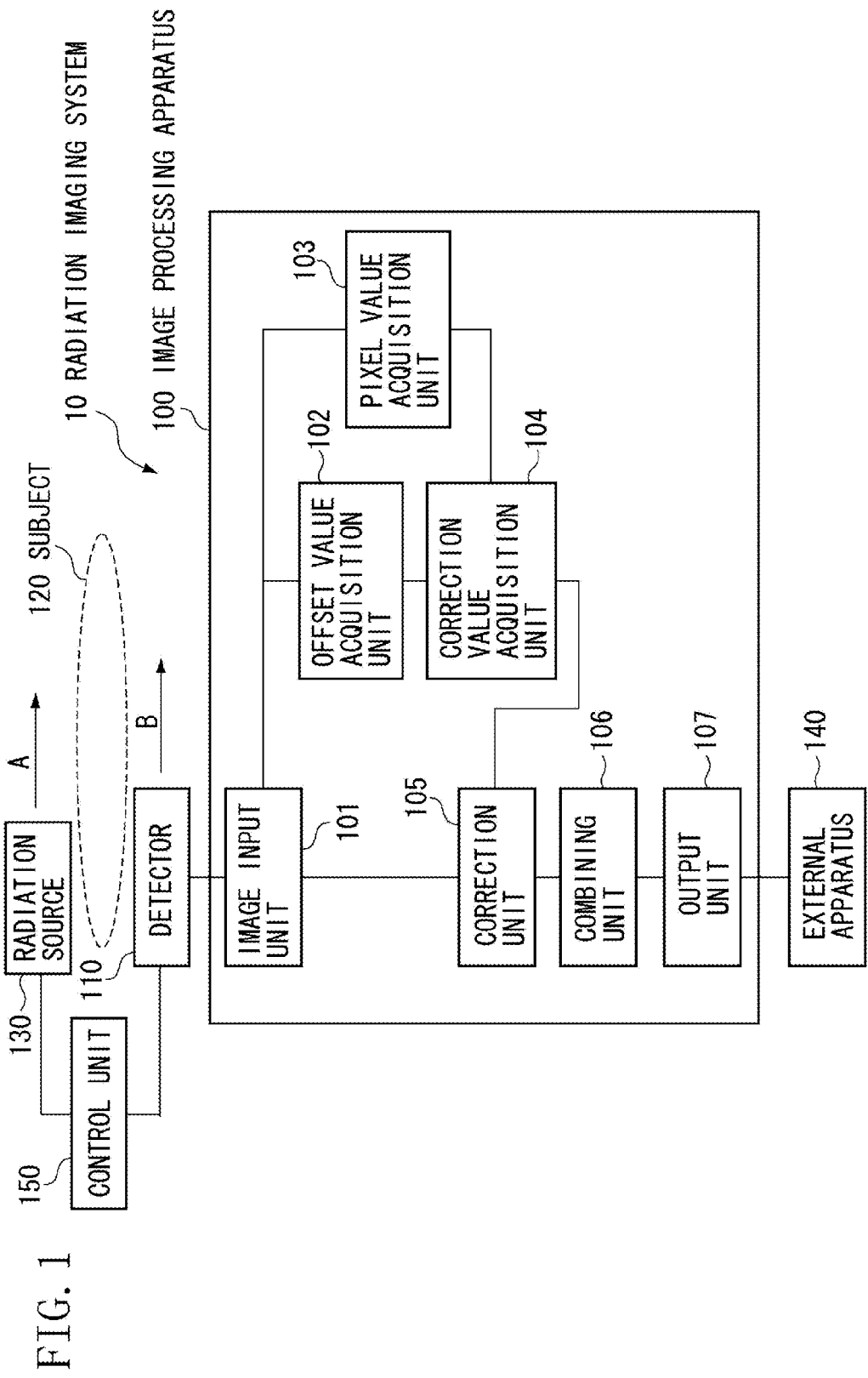
FIG. 1 illustrates a configuration of a radiation imaging system.
Figure 2:
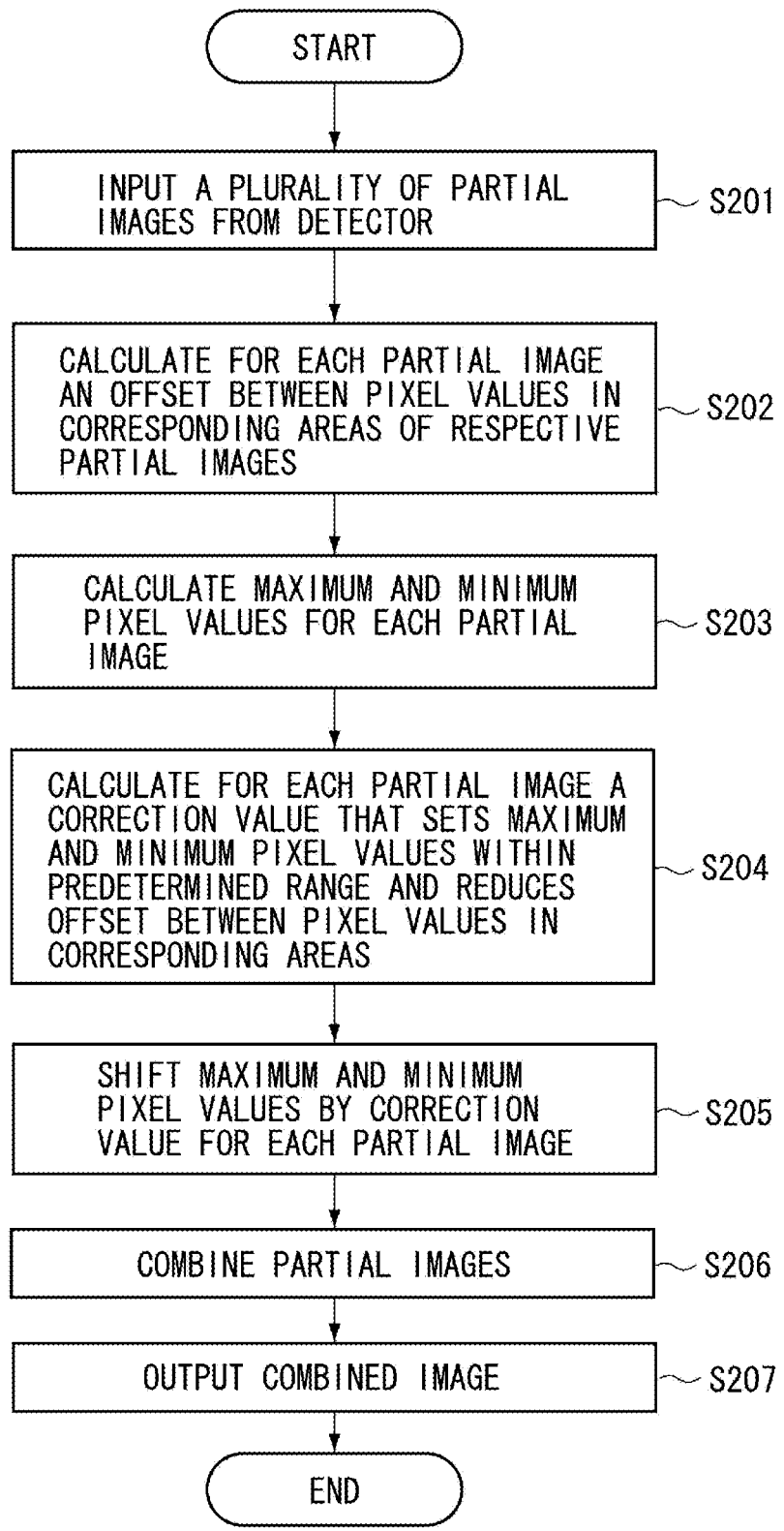
FIG. 2 is a flow chart illustrating processing performed by an image processing apparatus.

A radiation imaging system 10 according to a first exemplary embodiment of the present invention will be described below with reference to FIGS. 1 to 3.

The radiation imaging system 10 includes an image processing apparatus 100 for combining a plurality of images, a detector 110 for detecting radiation to acquire images, a radiation source 130 for generating radiation to be radiated onto a subject 120, and an external apparatus 140 to which a combined image is output. The radiation imaging system 10 further includes a control unit 150 (imaging control unit) for controlling the drive of the radiation source 130 and the detector 110 to divide the imaging region of the subject 120 into a plurality of partial imaging ranges and then capture images. Specifically, as illustrated in FIG. 1, control unit 150 controls the radiation source 130 and the detector 110 to synchronously move (in the direction of A and B respectively), so that a plurality of partial images of subject 120 are obtained. In one embodiment, corresponding to the control by the control unit 150, the movement and the performing of imaging are occurred sequentially.

A configuration of the image processing apparatus 100 will be described below with reference to FIG. 1. An image input unit 101 inputs a plurality of partial images acquired by the detector 110. The detector 110 captures the plurality of partial images of a plurality of partial imaging ranges formed by dividing an imaging region of the subject 120. That is, the detector 110 captures the plurality of partial images, by selectively imaging the plurality of partial ranges.

An offset value acquisition unit 102 acquires as an offset value for each partial image a difference between pixel values of corresponding areas of respective input partial images. The offset value indicates a difference between pixel values of corresponding areas of respective partial images due to, for example, a difference in a light exposure amount to the detector 110. When partial images are joined, the offset value makes the seams of images noticeable.

A pixel value acquisition unit 103 acquires minimum and maximum pixel values for each partial image as values indicating a pixel value range, and defines a difference between the minimum and maximum values as a value indicating the pixel value range. Using the offset value, a correction value acquisition unit 104 calculates a shift correction value so that the pixel value range falls within a predetermined output gradation range and the seams of images are made unnoticeable. Specific processing will be described below.

A correction unit 105 performs correction by shifting the pixel value range by the calculated correction value for each partial image. For example, when a partial image has a pixel value range from 400 to 2800 (represented by (minimum value, maximum value)=(400, 2800)) and a correction value −400, shifting pixel values means shifting minimum and maximum values to 0 and 2400 (represented by (minimum value, maximum value)=(0, 2400)). This correction processing for shifting pixel values does not include correction processing for expanding or reducing the pixel value range, i.e., the dynamic range.

A combining unit 106 combines a plurality of partial images to generate a combined image (long image). An output unit 107 outputs the combined image formed by the combining unit 106 to the external apparatus 140. The external apparatus 140 is a display apparatus for displaying an image.

The external apparatus 140 may be any one of an image forming apparatus for forming a combined image on a recording medium, a server type recording apparatus for recording image data, and an image processing apparatus for performing gradation processing. Further, the external apparatus 140 may include all of these apparatuses.

A flow of processing performed by the image processing apparatus 100 will be described below with reference to FIG. 2.

In step S201, the image input unit 101 inputs a plurality of partial images captured for a plurality of partial imaging ranges formed by dividing the imaging region of subject 120. The image input unit 101 sends the plurality of partial images to the offset value acquisition unit 102, the pixel value acquisition unit 103, and the correction unit 105.

In step S202, the offset value acquisition unit 102 calculates for each partial image a difference (offset value) between pixel values representative of overlapping areas of respective partial images. As a method for calculating an offset value, the present exemplary embodiment employs a method for obtaining a difference between averages, as a representative pixel value, for overlapping areas. As another example method for calculating an offset value, it is also possible to apply a method for calculating a shift value so that a difference between histograms in overlapping areas is minimized. In short, it is necessary to perform processing for calculating a value indicating pixel value distribution of overlapping area, for example tendency of pixel values or a difference between pixel levels in overlapping images.

If a partial image contains an area where there is no subject, the offset value acquisition unit 102 sets a subject area in the partial image and then calculates a difference between pixel values in overlapping areas of respective partial images in the subject area. Although the offset value acquisition unit 102 sets a subject area by using an area extracted by a known algorithm, a user can use an area specified on an image displayed on a display unit (not illustrated).

In a radiation image, assuming that a subject area (area under observation) is a target area, acquiring a difference between pixel values in the relevant areas can make the seams of images unnoticeable in the target area.

When a subject area has been extracted, areas in respective partial images having the same anatomical structure can be considered as corresponding areas. Further, in a radiation image, areas in respective partial images experientially known to be converted into images having the same pixel values can be considered as corresponding areas. This enables acquiring an offset value even if there are no overlapping areas in respective partial images.

In step S203, the pixel value acquisition unit 103 calculates values indicating a pixel value range for each partial image. Specifically, the pixel value acquisition unit 103 extracts minimum and the maximum pixel values for each partial image, and calculates a difference therebetween to obtain a pixel value range.

Calculating a maximum pixel value, except for pixel values of saturation pixels or defective pixels, as a value indicating a pixel value range enables acquiring a value accurately indicating a pixel value range of the subject 120. A saturation pixel means a pixel having an amount of exposure exceeding the maximum amount of exposure that can be measured by the detector 110.

Similar to step S202, if an image contains an area where there is no subject, the pixel value acquisition unit 103 sets a subject area in the image, and then calculates maximum and minimum pixel values in the subject area.

In step S204, the correction value acquisition unit 104 acquires for each partial image a correction value to be used for shift correction by using the offset value calculated by the offset value calculation unit 102 and the minimum and maximum pixel values calculated by the pixel value acquisition unit 103.

The correction value acquisition unit 104 calculates a correction value so that the minimum and maximum pixel values fall within a predetermined range after the shift correction is made. The predetermined range is a display gradation range of the external apparatus 140 (display apparatus).

Calculating a correction value so that the pixel value range falls within the display gradation range enables preventing underexposure and overexposure of pixels and accordingly generating a combined image without reducing the dynamic range.

FIG. 3 illustrates an example result of calculation by the correction value acquisition unit 104. FIG. 3 illustrates an example process of calculating a correction value for each of three partial images (partial images 1, 2, and 3).

Offset values of the partial images 1, 2, and 3 are (0, −600, −700), respectively. Minimum and maximum pixel values of the partial images 1, 2, and 3 are (500, 2500), (500, 2400), and (300, 2900), respectively. The correction value acquisition unit 104 adds these offset values to respective minimum and maximum pixel values to obtain (500, 2500), (−100, 1800), and (−400, and 2200).

When the display gradation range is 0 to 4095, the partial images 1 and 3 are out of range. Therefore, the correction value acquisition unit 104 subtracts −400 (a minimum value of the sum of the offset values and the minimum and maximum pixel values) from the offset value to obtain a correction value for each partial image. Obtaining correction values in this way enables setting the pixel value range within the display gradation range.

In step S205, the correction unit 105 performs correction by shifting the pixel value range by the correction value. Specifically, the correction unit 105 adds the correction value to the minimum and maximum values to perform shift correction for each partial image. Referring to FIG. 3, after performing shift correction by using acquired correction values, the partial images 1, 2, and 3 have minimum and maximum pixel values (900 2900), (300, 2200), and (0, 2600), respectively.

Although the present exemplary embodiment acquires three partial images, the present exemplary embodiment is also applicable to four or more partial images or two partial images captured for four or more partial imaging ranges formed by dividing a imaging region of a subject.

Performing shift correction enables reducing a difference between pixel values in corresponding areas of respective partial images, and accordingly generating images as if they are captured under the same imaging conditions.

In this case, a predetermined range (a threshold value of pixel value range) can be set not only as a display gradation range but also as various values. When displaying an image on the display apparatus, the correction value acquisition unit 104 acquires the input/output characteristics of the display apparatus and employs as a predetermined range an input pixel value range having the highest output contrast in the input/output characteristics.

Storing the relevant values in a storage unit (not illustrated) for each display unit and setting a predetermined range by using the stored values enable acquiring a combined image suitable for each display apparatus. This also enables setting a predetermined range according to the input/output characteristics of the image forming apparatus. Thus, it becomes possible to generate a combined image suitable for the input/output characteristics of the image forming apparatus such as a display apparatus and a printer.

When images are recorded in a defined recording format on a recording apparatus such as a server apparatus, a predetermined range can be set by using the gradation number defined by the recording format. Similarly, when the external apparatus 140 is an image processing apparatus different from the image processing apparatus 100, a predetermined gradation number in image processing performed by the external apparatus 140 can be set as a predetermined range.

Thus, it becomes possible to perform combining processing according to the recording format of the recording apparatus and the settings of the image processing apparatus to generate a combined image. Changing the output range in this way enables acquiring a combined image having a pixel value range according to a purpose.

In step S206, the combining unit 106 combines a plurality of partial images to generate a combined image. Specifically, the combining unit 106 performs combining processing while, in overlapping (common) areas of any two partial images, changing the contribution for each partial image according to the distance from a peripheral edge portion for each partial image.

Images may be joined by applying a known algorithm. If partial images do not overlap with each other, the combining unit 106 connects partial images by using a known interpolation method to join the partial images.

In step S207, the output unit 107 outputs the combined image to the display unit. The display unit displays shift correction values for portions of the combined image corresponding to respective partial images in the combined image. The user can check on the display screen how much pixel values have been shifted with respect to the original image.

The combined image may be output to an output apparatus such as a laser imager or a storage apparatus such as a hard disk drive (HDD). Further, the combined image may be output to an image processing system for separately performing gradation processing.

Storing partial images within a display gradation range in this way enables storing pixel values of the final combined image within a predetermined range, and accordingly generating a visually natural image having a suitable dynamic range.

Correcting each partial image enables correcting a difference between pixel values in corresponding areas of respective partial images, and accordingly acquiring after image combination an image as if it is captured by one imaging operation. Particularly in an X ray image, similar processing to an ordinary single-shot image can also be applied to a combined image.

As a result, a single-shot image and a combined image have similar characteristics due to the processing mode, which enables a diagnostician to observe both images based on a similar criterion. This is very useful for diagnosis.

A second exemplary embodiment will be described below with reference to FIGS. 1, 2, and 4. In the present exemplary embodiment, a shift correction value for one partial image is determined by image information of other partial images.

The correction value acquisition unit 104 calculates for each partial image a shift correction value so that variation in signal-to-noise (S/N) ratio is reduced. In relation to the configuration and processing flow of the image processing apparatus 100, a method for acquiring a correction value by the correction value acquisition unit 104 in a different way from the first exemplary embodiment, will be described.

In step S204, the correction value acquisition unit 104 calculates for each partial image a correction value used for gradation correction based on the offset value calculated by the offset value acquisition unit 102, and the minimum and maximum pixel values calculated by the pixel value acquisition unit 103.

The correction value acquisition unit 104 calculates a correction value so that the minimum and maximum pixel values fall within a predetermined range, and the absolute value of the sum of correction values for each partial image is minimized after shift correction. Thus, variation in S/N ratio can be reduced.

Variation in S/N ratio will be described below based on the correction value. The formula of the S/N ratio is represented by formal 1. The S/N ratio indicates a ratio of the amount of signal to the amount of noise.

$$SN = \frac{\text{Ave}}{\text{Std}} \quad \text{(Formula 1)}$$

where Ave is the average of an image, and Std is the standard deviation thereof, which are represented by formulas 2 and 3, respectively.

$$\text{Ave} = \frac{1}{n}\sum_{i=0}^{n-1} Pi \quad \text{(Formula 2)}$$

$$\text{Std} = \sqrt{\frac{1}{n}\sum_{i=0}^{n-1} (\text{Ave} - Pi)^2} \quad \text{(Formula 3)}$$

where Pi is a pixel value and n is the number of pixels.

When the correction value is represented by $\alpha$, the average Ave(correct) and the standard deviation Std(correct) of an image after shift correction are represented by formulas 4 and 5, respectively.

$$\text{Ave(correct)} = \text{Ave} + \alpha \quad \text{(Formula 4)}$$

$$\text{Std(correct)} = \text{Std} \quad \text{(Formula 5)}$$

where the average changes with shift correction but the standard deviation remains unchanged therewith. The S/N ratio after shift correction is represented by formula 6.

$$SN(\text{correct}) = \frac{\text{Ave} + \alpha}{\text{Std}} \quad \text{(Formula 6)}$$

This means that the S/N ratio changes when shift correction is applied to pixel values of a partial image.

Therefore, when a specific partial image is largely corrected, the S/N ratio largely varies and accordingly the visual state becomes largely different for each individual partial image. Therefore, the present invention corrects all of partial images little by little to reduce variation in S/N ratio for each partial image and accordingly generating an image with less unnatural feeling.

FIG. 4 illustrates a process of correction value calculation by the correction value acquisition unit 104. FIG. 4 illustrates an example correction value calculation for the three partial images (the partial images 1, 2, and 3).

Offset values for the partial images 1, 2, and 3 are (0, −600, 300), respectively. Minimum and maximum pixel values of the partial images 1, 2, and 3 are (500, 2500), (400, 2400), and (300, 2900), respectively. Based on these offset values, the correction value acquisition unit 104 calculates for each partial image a temporary correction value so that the absolute value of the sum is minimized. Thus, temporary correction values (100, −500, 400) are obtained. Specifically, these temporary correction values can be obtained by calculating an average of all of the offset values, and then subtracting the average from respective offset values.

Then, the correction value acquisition unit 104 adds these temporary correction values to respective minimum and maximum pixel values to obtain (600, 2600), (−100, 1900), and (700, 3300). When the pixel value range is from 0 to 4095, since the partial image 3 is out of range, the correction value acquisition unit 104 adds a value of −100 to respective temporary correction values to obtain corrections values (+200, −400, +500).

Reducing a difference between correction values in this way enables reducing variation in S/N ratio, and accordingly generating an image with less unnatural feeling. Even when combining partial images having undergone gradation conversion, minimizing variation in S/N ratio enables reducing variation in pixel values, and accordingly reducing variation in brightness of a combined image.

In the above-mentioned processing in the second exemplary embodiment, the correction value acquisition unit 104 obtains correction values by calculating an intermediate value between the minimum and maximum offset values, and then subtracting the intermediate value from respective offset values. This method enables reducing the maximum absolute value of respective offset values.

In a third exemplary embodiment, if a result of correction value calculation exceeds a predetermined range, the image processing apparatus 100 does not perform correction for partial images having a correction value exceeding a predetermined range. The present exemplary embodiment will be described below with reference to FIGS. 1, 2, and 5. In relation to the configuration and processing flow of the image processing apparatus 100, a method for acquiring a correction value by the correction value acquisition unit 104 in a different way from the first exemplary embodiment, and processing by the correction unit 105, will be described.

In step S204, the correction value acquisition unit 104 calculates for each partial image a correction value used for gradation correction based on the offset value calculated by the offset value acquisition unit 102, and the minimum and maximum pixel values calculated by the pixel value acquisition unit 103. When the minimum and maximum pixel values are not included in the predetermined range after gradation correction, the correction value acquisition unit 104 sets the correction value to 0.

Setting the correction value to 0 when the minimum and maximum values are not included in the predetermined range enables image combination without performing extreme image correction even if an abnormally large or small offset value is calculated because of a certain error.

For example, when combining images not having overlapping areas, an abnormally large or small offset value may be calculated in many cases. In particular, when partial images are positioned through manual operation, combination processing can be instructed regardless of image arrangements. In this case, gradation correction not only is meaningless but also has a possibility of losing image information. This is a reason why the present invention is very useful.

Further, the present invention is useful particularly when an output medium has a very large pixel value range. In almost all cases where a calculated correction value exceeds a very large predetermined pixel value range, a certain error may have occurred.

It is also possible to use a method for setting, if a shift value that minimizes a difference between averages for respective partial images or a difference between histograms therefor exceeds a predetermined range, the shift value to 0.

Offset values are calculated by adding respective shift values. A shift value shift 1 denotes a difference between the partial images 1 and 2, and a shift value shift 2 denotes a difference between the partial images 2 and 3. When an offset value offset 1 of the partial image 1 is represented by A (formula 7), an offset value offset 2 of the partial image 2 and an offset value offset 3 of the partial image 3 are represented by formulas 8 and 9, respectively.

$$\text{offset1} = A \quad \text{(Formula 7)}$$

$$\text{offset2} = \text{offset1} + \text{shift1} \quad \text{(Formula 8)}$$

$$\text{offset3} = \text{offset2} + \text{shift2} \quad \text{(Formula 9)}$$

When there is no overlapping area between the partial images 1 and 2 and there is an overlapping area between the partial images 2 and 3, the shift value shift 1 between the partial images 1 and 2 becomes an abnormal value. When the shift value is used for calculation as it is (without setting the shift value to 0), both the offset value offset 2 of the partial image 2 and the offset value offset 3 of the partial image 3 become an abnormal value. Then, setting the shift value shift 1 between the partial images 1 and 2 to 0 conforms pixel values of the partial images 2 and 3 to each other, enabling an optimal image to be obtained.

As described above, if a correction value exceeds a predetermined range, not performing gradation correction enables reducing the influence of combination of images not having an identical portion. This method is useful particularly when partial image arrangements can be freely set through manual operation.

Figure 6:
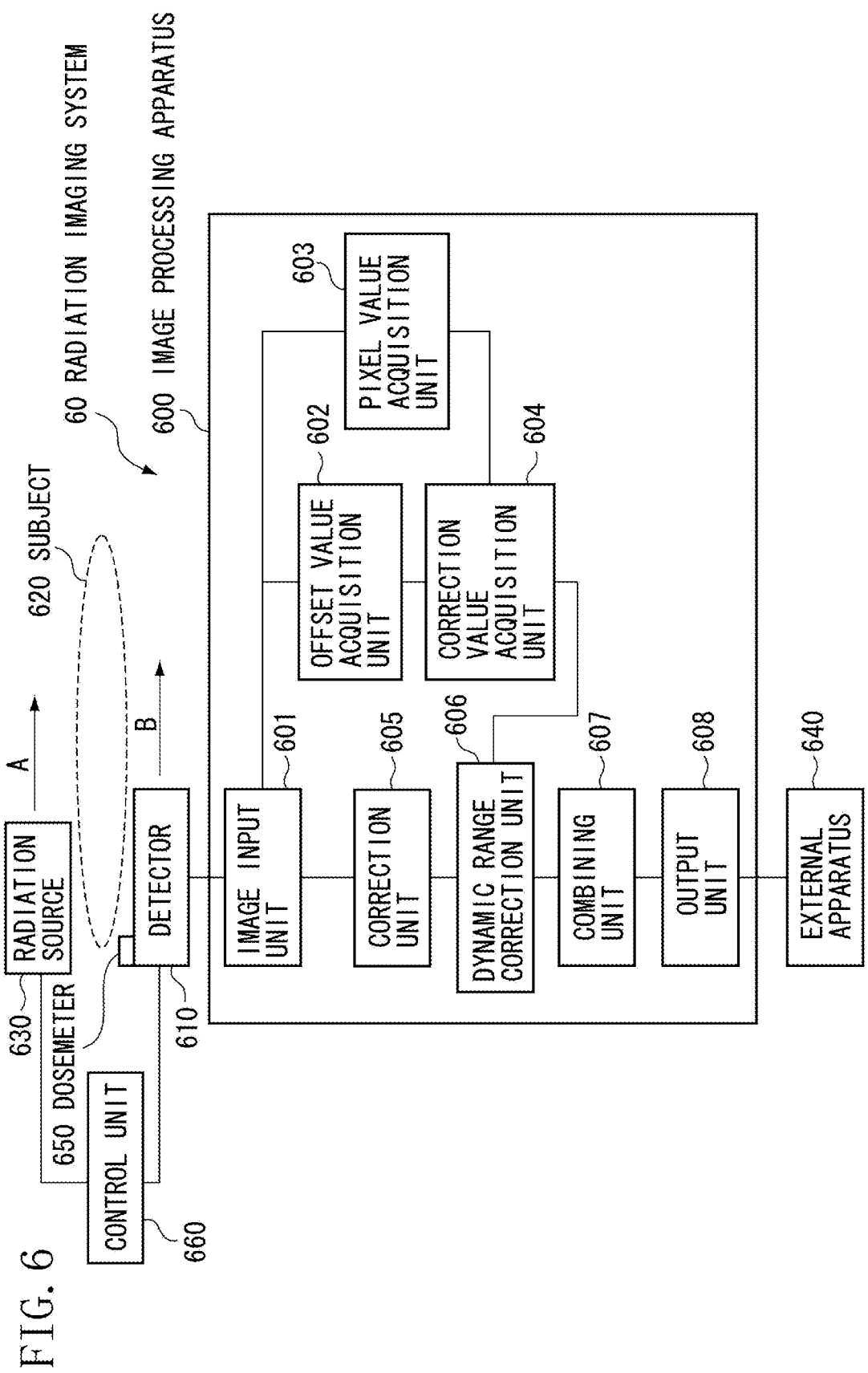
FIG. 6 illustrates a configuration of a radiation imaging system.
Figure 7:
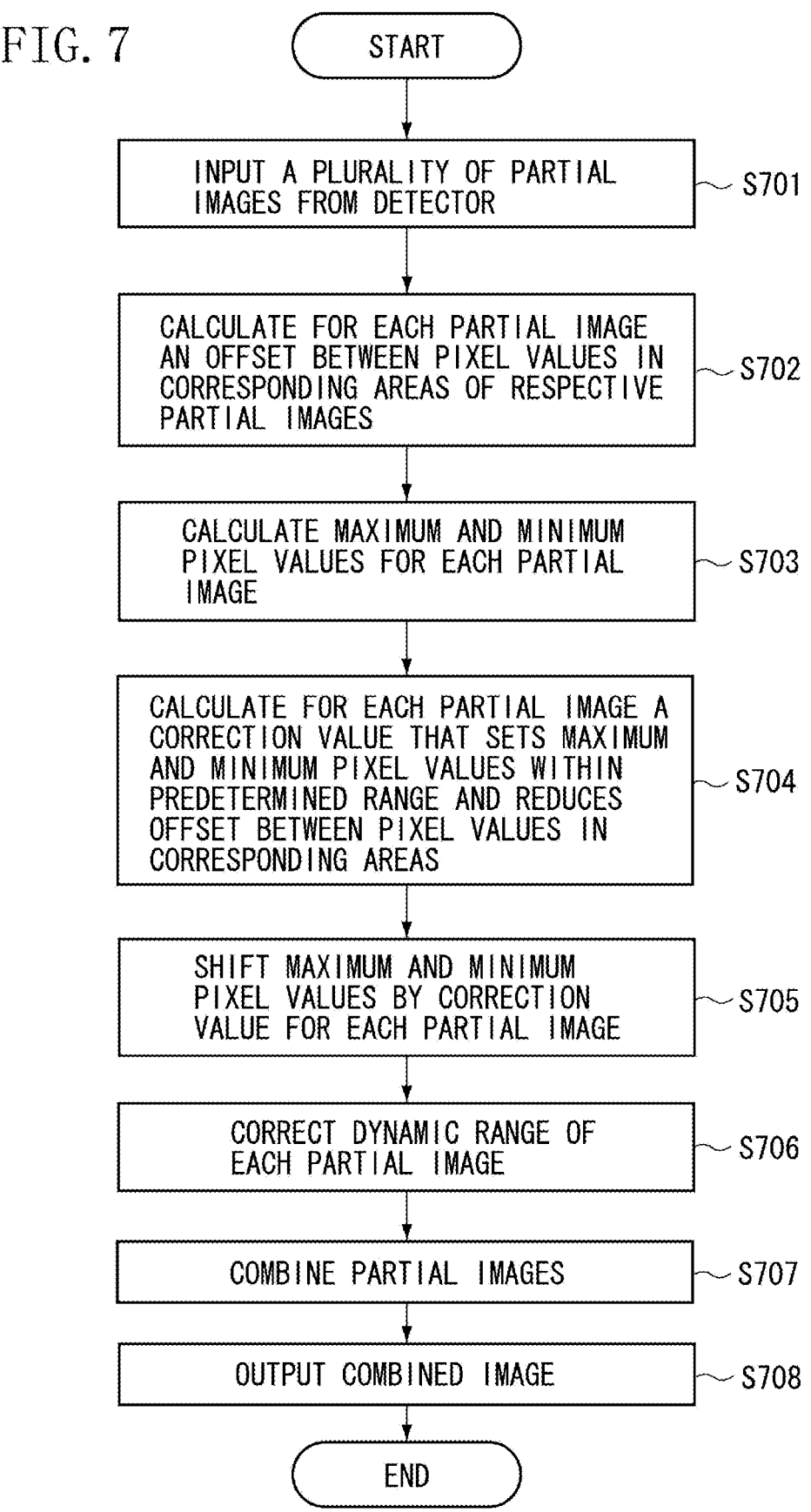
FIG. 7 is a flow chart illustrating processing performed by the image processing apparatus.

A fourth exemplary embodiment will be described below with reference to FIGS. 6 and 7. In the fourth exemplary embodiment, an image processing apparatus 600 performs dynamic range correction for each partial image so that a pixel value range of a combined image does not exceed a predetermined range. A configuration of the image processing apparatus 600 according to the present exemplary embodiment will be described below. However, descriptions will be omitted for elements 601, 602, 603, 604, 605, 607, 608 and 640 which are similar to 101, 102, 103, 104, 105, 106, 107 and 140, respectively, which are described in the first exemplary embodiment.

A radiation imaging system 60 includes a dosemeter 650 on the surface of a detector 610 or therein. The dosemeter 650 detects radiation generated by a radiation source 630, radiated onto a subject 620, while the radiation source 630 and the detector 610 move synchronously (in step mode) in the direction of arrows A and B. Radiation that has penetrated the subject 620 is detected by the detector 610 and the dosemeter 650. The dosemeter 650 outputs a detected value to a control unit 660. When the detector 610 is a so-called indirect type X-ray image sensor having a fluorescent substance, the dosemeter 650 for measuring the light quantity of visible light may be provided between the fluorescent substance and a photoelectric conversion element.

The control unit 660 is an imaging control unit for controlling the detector 610 and the radiation source 630 to divide imaging region of the subject into a plurality of partial imaging ranges, and then capture images. In the present exemplary embodiment, the control unit 660 also serves as a dose control unit for controlling the dose of radiation generated by the radiation source 630, based on a result of measurement received from the dosemeter 650. This control mechanism is generally referred to as auto exposure control (AEC).

Since each of a plurality of partial images acquired from a system using this control mechanism has a different dose, the visual state may be largely different for each individual partial image. In this case, applying the combination processing according to the present invention is useful.

The image processing apparatus 600 of the radiation imaging system 60 includes a dynamic range correction unit 606 configured to apply dynamic range conversion to an image.

A flow process performed by the image processing apparatus 600 can be described with reference to FIG. 7. However, since the flow process of FIG. 7 is substantially similar to the flow process of FIG. 2, steps S201, S202, S203, S204, S205, S206 and S207 are similar to steps S701, S702, S703, S704, S705, S707 and S708, respectively. Thus, to avoid unnecessary repetition, only step S706 will be described herein. In step S706, the dynamic range correction unit 606 performs dynamic range correction. More specifically, the dynamic range correction unit 606 converts the dynamic range to set a minimum value of minimum pixel values of respective partial images and a maximum value of maximum pixel values of respective partial images within an output pixel value range.

In dynamic range conversion, the dynamic range correction unit 606 uses a method for generating a gradation curve so that input pixel values become set output pixel values, and the contrast in the vicinity of a specific input pixel value becomes constant, and applies the gradation curve to all of partial images.

The input pixel values are a minimum value of minimum pixel values and a maximum value of maximum pixel values, and the output pixel values are a pixel value range determined by an output medium and the usage of images. Thus, applying the same gradation curve to respective partial images enables generating a combined image without unnatural feeling.

The dynamic range correction is not limited thereto, but may be processing for setting the minimum and maximum pixel values of respective partial images within a predetermined pixel value. The above-mentioned processing enables obtaining an image having a dynamic range optimized for each partial image, and is useful in obtaining a combined image after dynamic range optimization for each partial image.

Thus, even if the pixel value range cannot be set within the output gradation range only by offset value optimization, the dynamic range of each partial image can be set within the output gradation range. The present invention is very useful particularly in outputting an image to an output medium such as a display and printer having a narrow dynamic range.

Processing performed by the output unit 107 according to the present exemplary embodiment will be described below. The output unit 107 displays shift correction values in association with portions corresponding to respective partial images of a combined image. The output unit 107 also displays a change icon to enable the user to change a shift correction value on the screen.

The user changes the shift correction value by clicking the change icon on the screen by using a mouse and keyboard (not illustrated). Based on the changed correction value, the correction unit 105 applies shift correction to the relevant partial image.

The output unit 107 displays the image. The above-described series of processing is applied when the user wants to focus on a specific partial image and observing of the specific partial image becomes difficult because of shift correction.

Then, the correction value acquisition unit 104 re-acquires correction values of other partial images according to the correction value of a partial image changed by the user. The correction value acquisition unit 104 performs this processing by determining other correction values according to the correction value changed by the user.

In this case, if any one partial image exceeds the output gradation range, the correction value acquisition unit 104 performs the above-described dynamic range change processing to conform the image to the output gradation. Thus, other partial images can be corrected according to a specific partial image and set within the output gradation range.

Also in the above-described exemplary embodiment, the calculation of the minimum and maximum pixel values by the pixel value acquisition unit 103 may be omitted. In this case, the correction value acquisition unit 104 calculates a correction value by using only the offset value so that the absolute value of the sum of correction values is minimized. Thus, when the predetermined pixel value range is large enough, an optimum correction value can be calculated through simplified processing.

As another example, the present exemplary embodiment may be achieved as an image processing system by distributing the processing performed by the image processing apparatus 100 or the image processing apparatus 600 to a plurality of apparatuses. Alternatively, the present exemplary embodiment may be achieved by distributing processing provided as one function block to a plurality of circuits or function blocks.

Aspects of the present invention can also be realized by a computer of a system or apparatus (or devices such as a CPU or MPU) that reads out and executes a program recorded on a memory device, or a non-transitory computer readable storage medium, to perform the functions of the above-described embodiment (s), and by a method, the steps of which are performed by a computer of a system or apparatus by, for example, reading out and executing a program recorded on a memory device or a non-transitory computer readable medium to perform the functions of the above-described embodiment(s). For this purpose, the program is provided to the computer for example via a network or from a recording medium of various types serving as the memory device (e.g., non-transitory computer-readable medium). Here, the non-transitory medium doesn't include transitory propagating signals per se but a cache memory contemporarily storing a cache data, a RAM and a tangible medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-191320 filed Aug. 27, 2010, which is hereby incorporated by reference herein in its entirety.

What is claimed is:

1. An image processing apparatus comprising:
an acquisition unit configured to acquire a pixel value range for each of a plurality of partial images captured for a plurality of partial imaging ranges which an imaging region of a subject is divided into, and a value indicating pixel value distribution of an overlapping area in each of the plurality of partial images;
a calculation unit configured to calculate for each partial image a shift amount for minimizing a difference between the values indicating pixel value distribution of the overlapping areas, and setting each of the pixel value range within a predetermined range; and a correction unit configured to shift pixel values by the shift amount for each partial image.

2. The image processing apparatus according to claim 1, wherein the calculation unit calculates for each partial image the shift amount for minimizing a difference between absolute values of the shift amounts.

3. The image processing apparatus according to claim 1, wherein the correction unit corrects the pixel value range so that variation in S/N ratio for each partial image is reduced.

4. The image processing apparatus according to claim 1, further comprising a generation unit configured to generate an image of the subject by joining the shifted partial images.

5. The image processing apparatus according to claim 4, further comprising an image processing unit configured to apply gradation conversion to the image generated by the generation unit.

6. The image processing apparatus according to claim 4, further comprising an output unit configured to output the image generated by the generation unit.

7. The image processing apparatus of claim 1, wherein, when a correction value exceeds the predetermined range, the correction unit does not correct pixel values.

8. The image processing apparatus according to claim 1, wherein, when the difference between the acquired pixel values exceeds a predetermined value, the correction unit corrects pixel values by setting the difference between the pixel values as a value not exceeding the predetermined value.

9. A radiation imaging system comprising:
the image processing apparatus according to claim 1;
a radiation source configured to irradiate the subject with radiation;
a dose control unit configured to control a dose of the radiation generated by the radiation source;
a detector configured to detect the radiation having the controlled dose to generate the partial image;
an imaging control unit configured to control the radiation source and the detector to generate the plurality of partial images;

a generation unit configured to generate an image of the subject by joining the partial images shifted by the correction unit; and an apparatus which is any one of a display unit configured to display the generated image, a recording apparatus configured to record an output image, and an image forming apparatus configured to form an output image on a recording medium.

10. An image processing method comprising:
acquiring a pixel value range for each of a plurality of partial images captured for a plurality of partial imaging ranges which an imaging region of a subject is divided into, and a value indicating pixel value distribution of an overlapping area in each of the plurality of partial images;
calculating for each partial image a shift amount for minimizing a difference between the values indicating pixel value distribution of the overlapping areas, and setting each of the pixel value range within a predetermined range; and
shifting pixel values by the shift amount for each partial image.

11. A non-transitory computer-readable storage medium storing a program for causing a computer to execute a method comprising:
acquiring a pixel value range for each of a plurality of partial images captured for a plurality of partial imaging ranges which a imaging region of a subject is divided into, and a value indicating pixel value distribution of an overlapping area in each of the plurality of partial images;
calculating for each partial image a shift amount for minimizing a difference between values indicating pixel value distribution of the overlapping areas, and setting each of the pixel value range within a predetermined range; and
shifting pixel values by the shift amount for each partial image.

* * * * *